United States Patent
Mayer

[15] 3,659,380
[45] May 2, 1972

[54] PLATE FOR CONTROLLING THE FILLING DENSITY IN PLANT CONTAINERS BEFORE OR DURING AN AUTOMATIC MAKING OF HOLES FOR PLANTS IN THE FILLING COMPOUND

[72] Inventor: Georg Mayer, Bolheim, Germany
[73] Assignee: Firma Mayer KG, Heidenheim-Mergelstetten, Germany
[22] Filed: Sept. 19, 1969
[21] Appl. No.: 859,538

[30] Foreign Application Priority Data

Sept. 20, 1968 Germany..................P 17 82 587.5

[52] U.S. Cl..................................................................47/1
[51] Int. Cl.................................................................A01g 9/08
[58] Field of Search.................................................47/1, 37

[56] References Cited

UNITED STATES PATENTS

| | | |
|---|---|---|
| 2,444,744 | 7/1948 | Mossholder..............................47/37 |
| 2,771,709 | 11/1956 | Ritter........................................47/1 |
| 2,826,003 | 3/1958 | Oki et al...................................47/1 |

FOREIGN PATENTS OR APPLICATIONS

| | | | |
|---|---|---|---|
| 751,782 | 1/1967 | Canada.....................................47/1 |
| 570,318 | 9/1931 | Germany..................................47/37 |
| 638,100 | 11/1936 | Germany..................................47/37 |
| 606,046 | 6/1960 | Italy..........................................47/37 |
| 329,644 | 6/1958 | Switzerland..............................47/37 |

Primary Examiner—Robert E. Bagwill
Attorney—Woodhams, Blanchard and Flynn

[57] ABSTRACT

A plate having an upwardly projecting offset for shaping soil inserted into a plant-receiving pot. The plate stacks the soil around the plant-receiving opening to make same available for filling same.

4 Claims, 8 Drawing Figures

INVENTOR.
GEORG MAYER

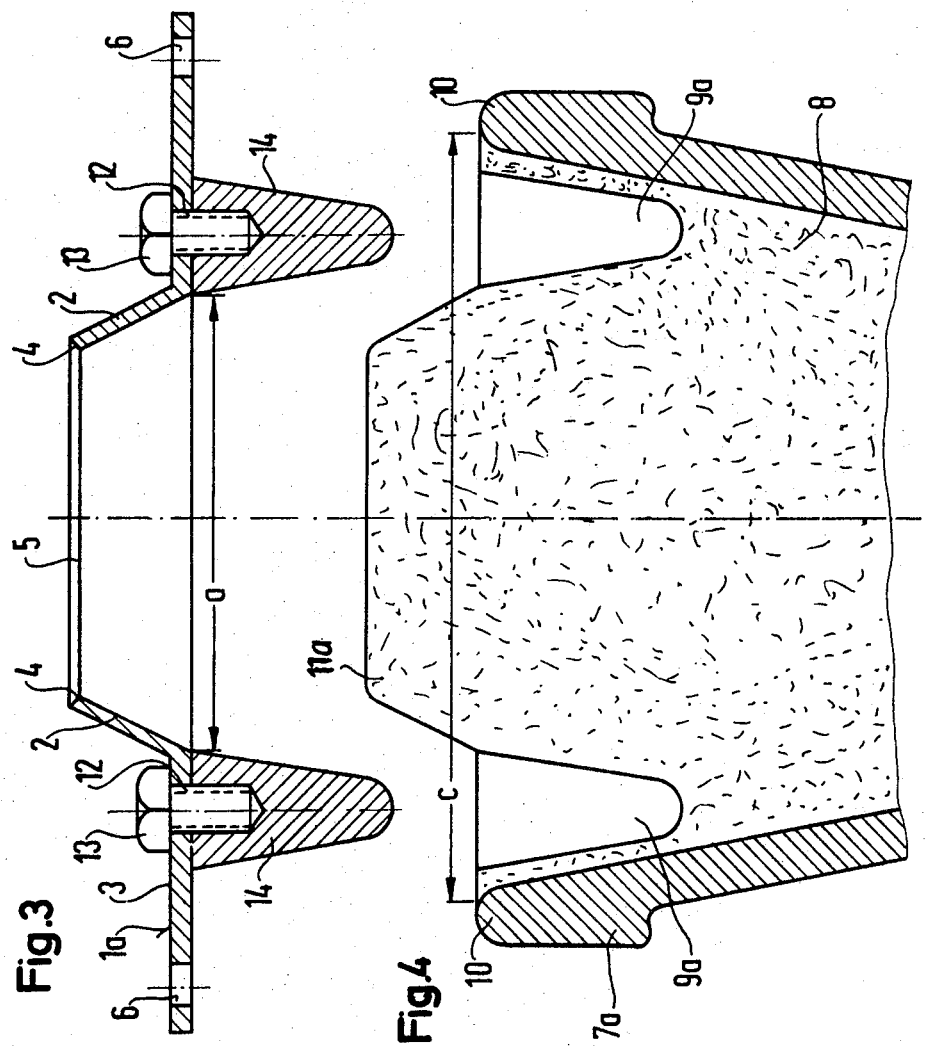

INVENTOR.
GEORG MAYER

INVENTOR.
GEORG MAYER
BY
Woodhams, Blanchard & Flynn
ATTORNEYS

PLATE FOR CONTROLLING THE FILLING DENSITY IN PLANT CONTAINERS BEFORE OR DURING AN AUTOMATIC MAKING OF HOLES FOR PLANTS IN THE FILLING COMPOUND

The invention relates to a plate for controlling the filling density of material in plant containers before and during an automatic making of plant-receiving holes therein.

In a potting and repotting machine in which the openings for the plants are made by means of a drill, it is already known to provide a plate which is placed onto the soil inside the plant container during the making of said openings. The plate presses the soil around the opening for the plant during the drilling operation, however, when the plate is lifted off it takes with it the soil which has been drilled out. Therefore, after the drilling operation, the soil is piled up around the opening for the plant at most to the upper edge of the plant container. No soil reserve is provided in order to fill out a root mass inserted into the hole for the plant or to cover the surface of an inserted root ball. This requires in such cases the supply of additional soil. Thus, it is not possible with this plate means to control the filling density according to the needs of the plants to be inserted.

Furthermore, a plate is known which during the drilling operation is supported against the edge of the plant container in which the drilling takes place. The plate is dimensioned so that it projects over the edge of the plant container both inwardly and outwardly. This plate does not help to compact the soil in the container. It also removes the soil which has been drilled out during the forming of a plant-receiving opening and does not leave a soil reserve available at the edge of the pot.

It is the purpose of the invention to construct a plate of the above-described type with simple means in such a manner as to leave, after the plate has been removed, a certain amount of soil in the plant container to provide the desired filling density.

To attain this purpose the invention provides that the plate has at least one offset projecting at its upper side, namely the side facing away from the plant container, for receiving and forming compound piled above the plant container.

The offset permits the formation of a soil reserve which projects over the edge of the container and can be used after the insertion of a plant for filling the hole with soil and pressing same into place. The filling quantity is thereby determined in a simple manner by the holding capacity of the offset. If during the filling of the soil into the plant container, the soil is already piled above its edge, then the placement of the plate on the soil effects not only a compacting of the contents of the container but also a forming and packing down of the piled-up soil. The plant container is thus prepared in such a manner that it can, if necessary, be provided with an opening for a plant without the plate and the plate can be lifted off again.

The offset has advantageously a cross section which converges away from the plate and is preferably circularly shaped. The piled-up soil thus forms a dome, a shape which during and after the removal of the plate is particularly stable. A breaking-off of soil is unlikely even during a transporting of the plant container. During and after the making of the hole for the plant, and during other handling thereof, the piled-up soil falls primarily into the inside of the plant container. In this manner the predetermined filling density is maintained.

The plate can advantageously be constructed as a multiple plate having a plurality of offsets which are spaced apart from each other for simultaneous cooperation thereof with several single plant containers or one multiple plant container. The plate thus makes possible in a simple manner a further rationalizing of the potting and repotting method, in particular where formed as so-called multiple plates which can receive a large number of plants. In this manner it is possible to meet easily the busy seasons which occur in nurseries due to the cycle of plant growth.

According to an advantageous embodiment of the plant of the invention, said plate has at its side facing the plant container one or more projections for making the holes for the plants. The soil which is removed during the penetration of the projection or the projections can accumulate under the offset. After the plate is removed and the plant has been inserted, a slight tapping of the plant container is sufficient to permit the accumulated soil to slide into the remaining open areas. Thus, the potting and repotting process is made simple, quick and clean for both single and multiple plates.

The projections are advantageously arranged in the offset preferably concentrically. Such a plate is particularly advantageous for the by far mostly used purpose of making of one concentric plant-receiving hole per plant container. The filling material of the plant container is evenly distributed and compacted both in the container and under the offset. The upper side of the offset offers a good reception surface of engagement surface for the pressure element which effects the lowering of the plate and the penetration of the projection into the filling material.

According to a further advantageous embodiment of the plate of the invention, the offset is constructed as an annular wall which has an opening through its top and which permits the making of the hole for the plant by means of a drill. Underneath the annular wall at least a portion of the soil which is removed during the drilling operation is arranged in a mass of soil which after the removal of the drill and the plate can be used for filling. The annular wall can also be used to maintain the shape of an already existing mass of soil during the drilling process if the plant container was already prepared by a plate of the afore-discussed form. Since the annular wall substantially prevents the throwing of drilled-out soil, the potting and repotting machine remains clean. Moreover, valuable soil is saved. Furthermore, the annular wall forms a protection for the worktool, in particular a contact protection for the drill. Multiple plates can also be provided with offsets open on top in form of annular walls. They make possible the use of multiple drilling machines for simultaneously making holes for plants in several single containers or one multiple plant container.

The upper diameter of the annular wall can have a dimension which is adjusted to the drill diameter to achieve a certain filling density in the plant container. The amount of soil which is removed from the pot during the drilling operation depends on the opening which remains between the drill and the annular wall opening. Depending on whether the plant to be inserted requires a loose or a compacted soil, by suitably selecting the diameter of the upper annular wall the amount of the removed soil can be observed and thus the amount of the remaining soil can be determined.

A further possibility of determining the filling density of the plant container with the plate of the invention lies in the selection of the diameter of the annular wall at a portion thereof which is close to the plate. The diameter can be smaller than the upper diameter of the plate container through which a small quantity of soil is obtained. Moreover, this embodiment makes easier the construction of a so-called pouring edge.

The diameter of the annular wall adjacent the plate can be the same as the upper diameter of the plant container and can thus make possible the construction of a larger mass of soil.

If, after the plant has been inserted, a particularly large amount of soil reserve is required whether it is for filling around a root ball or a repeated compacting of the container contents by pressing the soil, an embodiment of the plate is advantageous in that the diameter of the annular wall adjacent the plate is larger than the upper diameter of the plant container and the plant container is enclosed by an annular protection plate at least until the insertion of the plant. The mass of soil thus extends beyond the plant container and soil piles up additionally on the annular protection plate, which soil can easily be moved into the container after the insertion of the plant. In a multiple plant container the connecting surfaces have the function of the annular protections.

An advantageous further development of the plate of the invention provides that at the underside of the plate there are arranged spaced supports approximately perpendicularly to said plate limiting its movement toward the plant container. The spacer supports take over a portion of the support pressure of the plate and thus relieve the plant container. Damage to the edge which would otherwise be unavoidable due to rough dimension tolerances of such containers are avoided in this manner. This protection is particularly important in the case of plant containers which are made of pressure-sensitive plastic and are being used in progressively larger numbers, for example, Styropor. The spaced supports can be mounted to both single and multiple plates.

The spaced supports can advantageously be mounted adjustably in height and/or removably to the plate. They can thus be adjusted in a simple manner to the respective purpose of use, particularly to the height of the plant container.

Exemplary embodiments of the invention are illustrated in the drawings, in which:

FIG. 3 is a cross-sectional view of another embodiment of a plate of the invention;

FIG. 4 is a cross-sectional view of a plant container with holes for plants, during the manufacture of which holes the plate of FIG. 3 was used;

Figure 1:
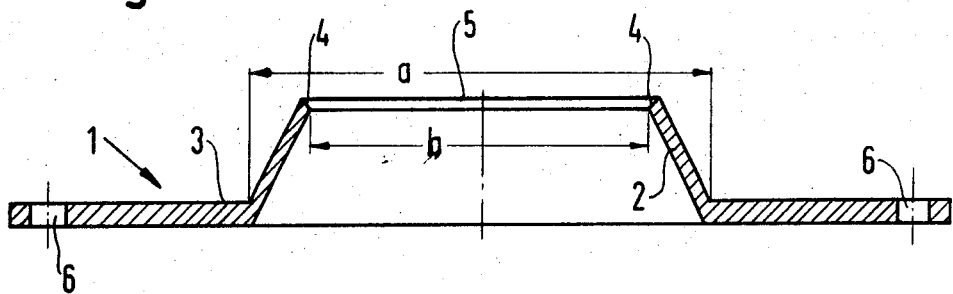
FIG. 1 is a cross-sectional view of a first embodiment of a plate of the invention.
Figure 2:
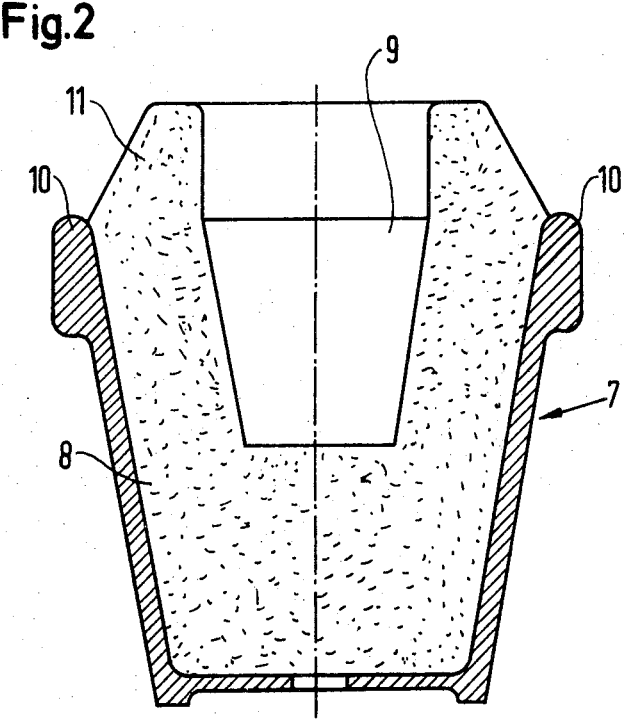
FIG. 2 is a cross-sectional view of a filled plant container with a hole for a plant, during the making of which hole the plate according to FIG. 1 was used.

The plate 1 illustrated in FIG. 1 has in its center an offset or hollow, frustum-shaped shell 2 which is constructed integrally with said plate as an annular wall and projects from same toward one side of the plate 3. The edge of the annular wall 2 which is distant from the plate forms a rim 4 around a circular opening 5. The annular wall is inclined with respect to the plate in such a manner that its annular diameter $a$ at the plate is larger than the diameter $b$ of the opening 5. The rim 4 is sloped toward the inside of the annular wall. The plate 1 has holes 6 near its outer periphery which holes permit the plate to be mounted to a potting and repotting machine. FIG. 2 illustrates a flower pot 7, the filling 8 of which has a hole 9 for a plant which was made by means of a drill potting and repotting device. Prior to the drilling operation, the plate 1 or the flower pot 7 illustrated in FIG. 2 was moved in such a manner that the plate 1 was supported against the upper edge 10 of the flower pot and pressed same against a support (not illustrated) thereof. The flower pot soil raised or removed during the drilling of the hole 9 for the plant was thereby prevented by the ring wall 2 from being lifted out of the opening 5. It was instead formed to comprise the mass of soil 11 which projects with a conical outer wall above the upper edge 10 of the flower pot 7 and same remained in this form after the plate 1 was lifted from the flower pot 7 or the flower pot 7 was lowered. The mass of soil 11 is a reserve of flower pot soil which after the plant is inserted into the hole 9 for the plant can be used to finish filling the hole and to cover root or pot balls.

FIG. 3 illustrates a further embodiment 1a of a plate of the invention which has the same annular wall 2 as the embodiment of FIG. 1. Besides the annular wall 2, in the cross-sectional plane on both sides thereof, tapped holes 12 are arranged in the plate through each of which holes a screw 13 is inserted. Each screw 13 is screwed into a projection 14 which is tapered conically downwardly away from the plate and is rounded off at the lower end.

The projections 14 are used for penetrating into the filling 8 of a flower pot 7a and for making holes 9a therein when the plate 1a and the flower pot 7a are moved together. FIG. 4 illustrates the flower pot 7a with the holes 9a for the plants after the holes have been made. The flower pot 7a has thereby an upper inner diameter $c$ which is larger than the diameter $a$ of the annular wall 2 at the plate. The flower pot soil which is removed during the formation of the holes 9a for the plants forms a mass of soil 11' with conical sidewalls underneath the annular wall 2, which mass of soil 11' remains after the plate 1a is lifted or the flower pot 7a is lowered.

The plate 1a has near its outer edge, like the plate 1, holes 6 which permit their mounting to a potting and repotting device.

Figure 5:
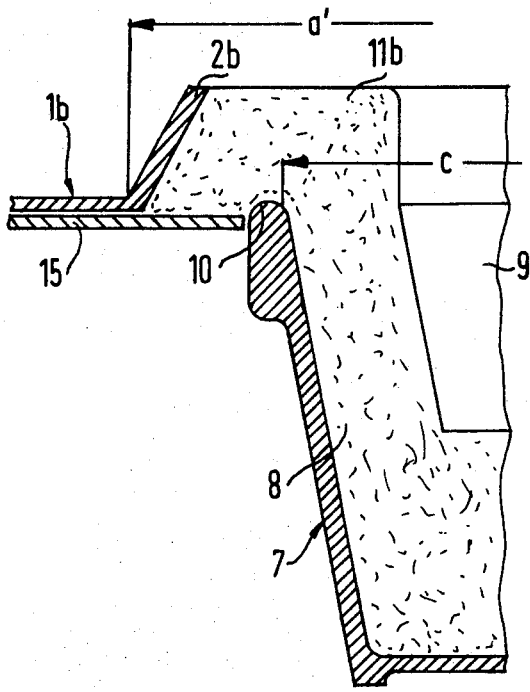
FIG. 5 is a broken cross-sectional view of a further embodiment of a plate of the invention used with a flower pot.

FIG. 5 illustrates a portion of a flower pot 7 into the filling 8 of which a hole 9 for a plant has been drilled. The upper edge 10 of the flower pot 7 is enclosed with a partially illustrated collector plate or annular protection plate 15 before the drilling operation which protection plate can be connected to the pot or its mounting in any desired manner, not illustrated. A plate 1b is supported on the annular projection plate 15, the annular wall 2b of which plate has at the plate an annular diameter $a'$ which is larger than the upper inner diameter $c$ of the flower pot 7. In this manner, during the drilling operation, a mass of soil 11b can be formed above the flower pot 7 which rests partly on the annular protection plate 15 and forms a particularly large soil reserve.

Figure 7:
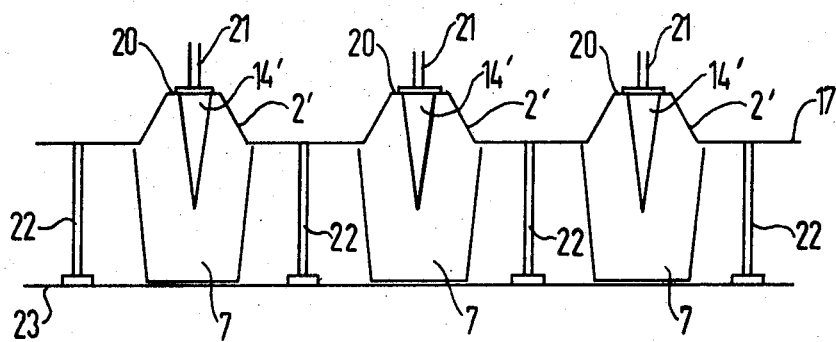
FIG. 7 is a schematic illustration of a further plate in connection with flower pots.
Figure 6:
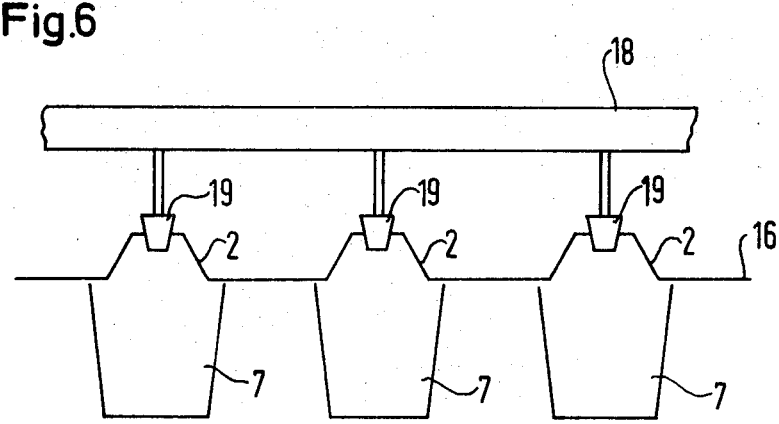
FIG. 6 is a schematic illustration of a further embodiment of a plate in connection with flower pots and a drilling device.

The schematic illustrations of FIGS. 6 and 7 show multiple plates 16 or 17 which permit the simultaneous making of holes for plants in several plant containers, here flower pots 7. In FIG. 6, the plate 16 has annular walls 2, three of which are illustrated. The drilling of the holes for the plants is done by a multiple drilling device 18 with drills 19, three of which are illustrated.

The multiple plate 17 of FIG. 7 has closed offsets 2'. They have the shape of a truncated cone with a circular cross section. At the underside of its upper surface 20 there is provided a projection 14' each which is concentric to the offset, said projection making a hole for a plant into the flower pot 7 during the placement of the plate 17 against the flower pot. The pressure required for pressing the projections 14' into the flower pot 7 is applied onto the plate 17 through pressure devices 21 which are connected to plate in any convenient manner, not illustrated, and to a pressing device, not illustrated. To relieve the load from the flower pots during the pressing in of the projections, spaced supports 22 are arranged between the offsets 2' at the lower side of the plate 17. They are supported on a support surface 23 in the end position of the plate 17 and receive the greatest amount of the pressure.

Figure 8:
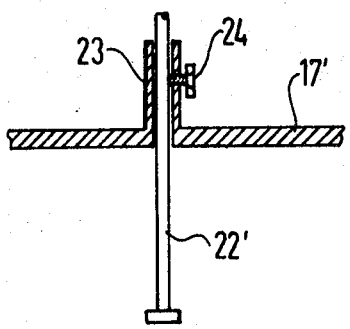
FIG. 8 illustrates a detail of a further embodiment of a plate on an enlarged scale.

FIG. 8 illustrates in an enlarged scale or cross section of a part of a plate 17' with a spaced support 22' which is arranged adjustably in height and removably on said plate. A sleeve 23' mounted to said plate 17' and is made of one piece therewith. The spaced pieces 22 are held adjustably in height by means of a clamping screw 24 in said sleeve 23.

The invention is not limited to the exemplary embodiments. The offset can be constructed either in an open or closed form with sidewalls which are arched or perpendicular to the plate. The exemplary embodiments which are illustrated as single plates can all be provided with spaced supports which are rigidly secured or are adjustable. To cooperate with such a plate, the annular projection can have openings for guiding the spaced supports therethrough. In place of the spaced supports, oppositely arranged supports can also be mounted to the plates for spaced supports which are upwardly directed toward the adjusting surfaces or the mounting of the plant container.

The plant containers each illustrated as a flower pot in the exemplary embodiments can also be constructed as cups, bags or, in the case multiple plates are used, also as multiple plant containers, for example, so-called multiple plates.

All characteristics disclosed in the description and the drawings including the structural details can also be important to the invention in other combinations.

The embodiments of the invention in which an exclusive property or privilege is claimed are defined as follows:

1. A device for controlling the filling density of filling material in a plant container during the provision of a plant receiving opening therein, comprising:

a generally flat plate having an opening therethrough;
a hollow shell on said plate encircling and communicating with said opening, the outwardly opening end of said shell remote from said plate having a smaller diameter than said opening in said plate;
a plurality of projections secured to and extending away from said plate on a side thereof opposite said shell and being adapted to form said plant receiving openings in said filling material.

2. A device according to claim 1, wherein said shell is of a frustum-shape and is concentric with said opening.

3. A device according to claim 1, wherein said opening in said plate is smaller than the upper diameter of said container.

4. A device according to claim 1, wherein said projections are spaced radially from the center line of said shell.

* * * * *